(12) United States Patent
Lopez et al.

(10) Patent No.: US 7,588,260 B2
(45) Date of Patent: Sep. 15, 2009

(54) SUSPENSION CONTROL ARM ASSEMBLY FOR VEHICLES

(75) Inventors: Jose M. Lopez, Brighton, MI (US); Wallace T. Hall, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 509 days.

(21) Appl. No.: 11/212,856

(22) Filed: Aug. 26, 2005

(65) Prior Publication Data

US 2007/0045980 A1  Mar. 1, 2007

(51) Int. Cl.
*B60G 3/12* (2006.01)
(52) U.S. Cl. .................. 280/124.128; 280/124.153
(58) Field of Classification Search .......... 280/124.128, 280/124.13, 124.134, 124.135, 124.145, 280/124.153, 124.154
See application file for complete search history.

(56) References Cited

U.S. PATENT DOCUMENTS

| | | | | |
|---|---|---|---|---|
| 2,007,952 A * | 7/1935 | Armstrong | .................. | 267/254 |
| 2,050,693 A * | 8/1936 | Favary | .................... | 267/229 |
| 2,054,288 A * | 9/1936 | Hastie | ................. | 280/124.153 |
| 2,069,399 A * | 2/1937 | White | ....................... | 267/244 |
| 2,085,662 A * | 6/1937 | Johnson | ...................... | 267/247 |
| 2,090,141 A * | 8/1937 | Newton | ....................... | 267/254 |
| 2,153,233 A * | 4/1939 | Best | ..................... | 280/124.153 |
| 2,164,470 A * | 7/1939 | Opolo | ................. | 280/124.153 |
| 2,246,847 A * | 6/1941 | Herreshoff | .................. | 267/281 |
| 2,266,280 A * | 12/1941 | Sherman | ..................... | 267/254 |
| 2,707,100 A * | 4/1955 | Schilberg | .................... | 267/254 |
| 2,762,632 A * | 9/1956 | Irvin | .................... | 280/124.107 |
| 3,193,302 A * | 7/1965 | Hill | ..................... | 280/124.128 |
| 3,400,945 A * | 9/1968 | Sampietro | ............ | 280/124.128 |
| 3,672,698 A * | 6/1972 | Froumajou | ............ | 280/124.153 |
| 3,694,000 A * | 9/1972 | Van Winsen | .......... | 280/124.128 |
| 3,727,713 A * | 4/1973 | Van Winsen et al. | ........ | 180/360 |
| 4,273,356 A * | 6/1981 | Sakata et al. | .......... | 280/124.144 |
| 4,717,171 A * | 1/1988 | Kami et al. | ................. | 280/834 |
| 4,744,587 A * | 5/1988 | Veneau | .................. | 280/124.15 |
| 4,754,992 A * | 7/1988 | Asanuma | ............. | 280/124.143 |
| 4,921,265 A * | 5/1990 | Eyb et al. | .................... | 280/638 |
| 4,998,748 A * | 3/1991 | Kashiwagi et al. | ........ | 280/5.524 |
| 5,924,712 A * | 7/1999 | Pierce | .................... | 280/124.13 |
| 6,073,946 A * | 6/2000 | Richardson | ................. | 280/86.5 |
| 6,073,947 A * | 6/2000 | Gottschalk et al. | .... | 280/124.128 |
| 6,092,819 A * | 7/2000 | Overby et al. | .......... | 280/124.153 |
| 6,095,563 A * | 8/2000 | Bushek | ........................ | 280/788 |
| 6,135,470 A * | 10/2000 | Dudding | .............. | 280/124.128 |
| 6,158,750 A * | 12/2000 | Gideon et al. | .............. | 280/86.5 |
| 6,267,397 B1 * | 7/2001 | Hamada et al. | ........ | 280/124.128 |
| 6,412,797 B1 * | 7/2002 | Park | ..................... | 280/124.125 |

(Continued)

FOREIGN PATENT DOCUMENTS

EP  239449 A1 * 9/1987

(Continued)

*Primary Examiner*—Paul N Dickson
*Assistant Examiner*—Laura Freedman

(57) ABSTRACT

A control arm assembly for a suspension system of a vehicle includes a control arm having a triangular shape for connection to vehicle structure and a beam axle of the vehicle. The control arm assembly also includes a plurality of bushings connected to the control arm and for connection to the vehicle structure and the beam axle of the vehicle.

7 Claims, 3 Drawing Sheets

U.S. PATENT DOCUMENTS

| | | | |
|---|---|---|---|
| 6,796,566 B2 * | 9/2004 | VanDenberg | 280/86.5 |
| 6,851,689 B2 * | 2/2005 | Dudding et al. | 280/124.128 |
| 6,880,839 B2 * | 4/2005 | Keeler et al. | 280/86.5 |
| 2001/0004149 A1 * | 6/2001 | Fujiki et al. | 280/124.135 |
| 2005/0073124 A1 * | 4/2005 | Lundmark | 280/124.13 |

FOREIGN PATENT DOCUMENTS

| | | | |
|---|---|---|---|
| GB | 2069947 A | * | 9/1981 |

* cited by examiner

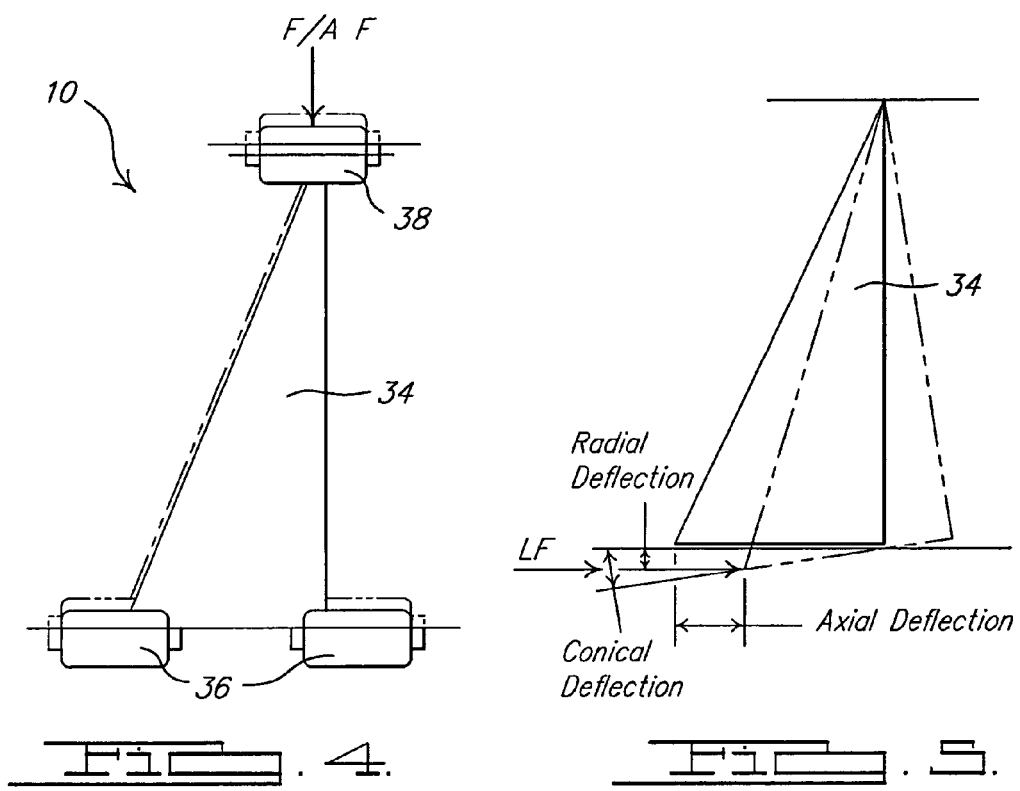
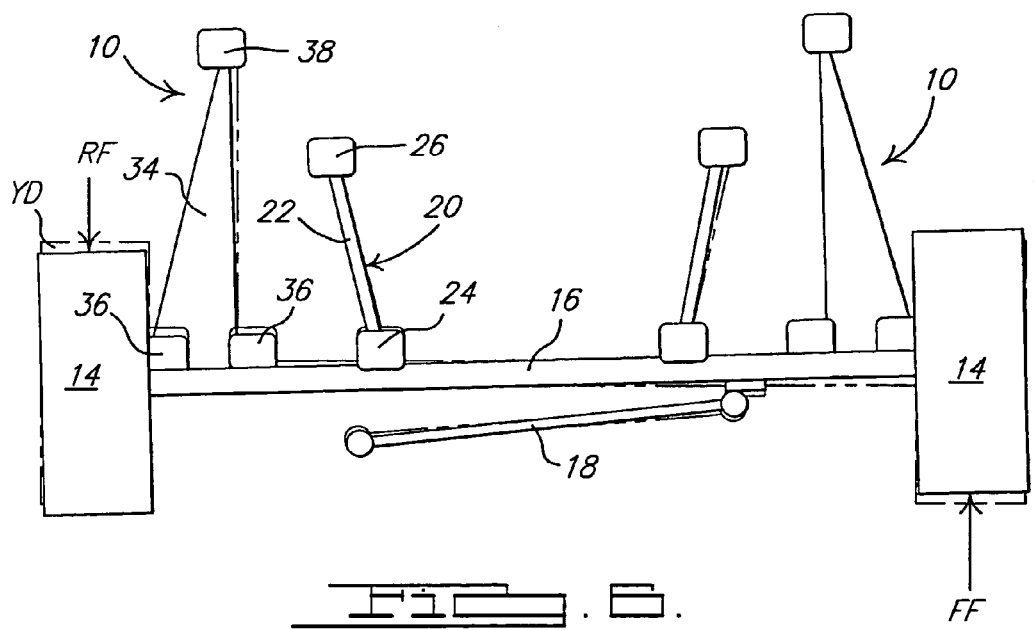

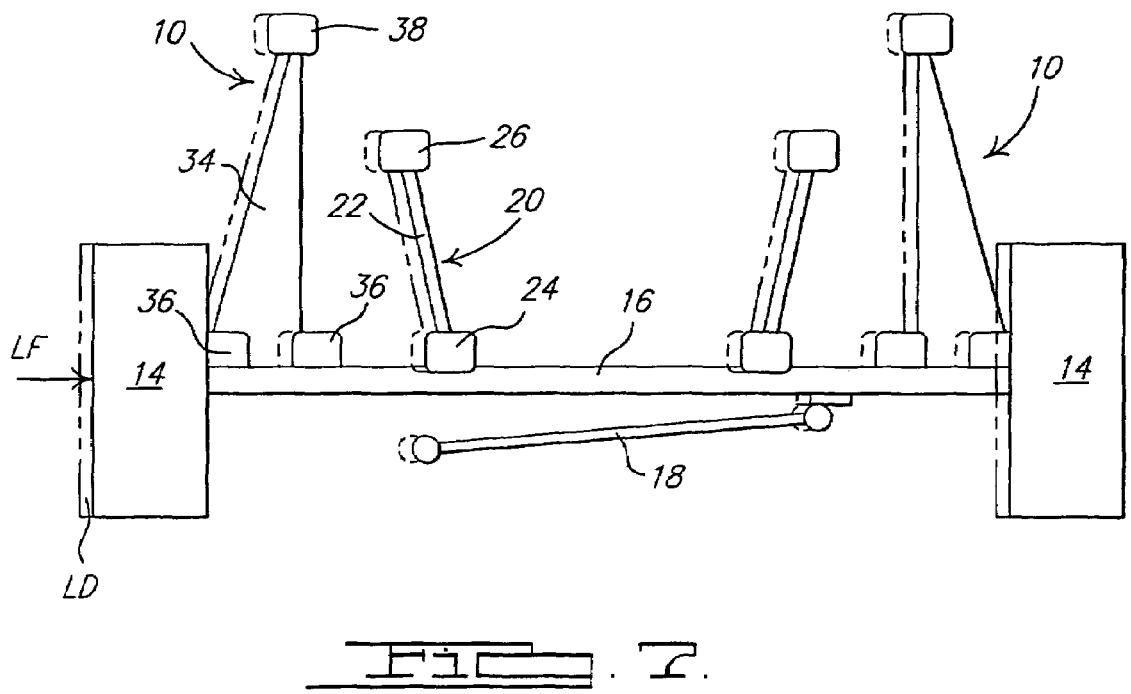

SUSPENSION CONTROL ARM ASSEMBLY FOR VEHICLES

TECHNICAL FIELD

The present invention relates generally to suspension systems for vehicles and, more particularly, to a control arm assembly for a suspension system of a vehicle.

BACKGROUND OF THE INVENTION

It is known to provide a beam axle suspension system for a vehicle. In a vehicle such as an automotive vehicle, the beam axle suspension system may be a five-link beam axle arrangement between a frame and wheels or tires of the vehicle. The beam axle arrangement typically includes a beam axle, upper and lower links, a track bar, and a spring and damper unit. In this arrangement, the beam axle extends between a pair of wheels and is located cross car via the lateral track bar. The beam axle is located fore and aft via the upper and lower links. The upper and lower links also locate the beam axle torsionally. The vertical location of this beam axle is located via the spring and damper unit. Other suspension arrangements may have the spring and damper as separate units.

Beam axle suspensions utilize specific links with rubber isolators such as bushings that are arranged to control the suspension's location throughout the suspension's travel during use. A rear suspension link geometry, and the fore/aft and lateral stiffness, controlled by the bushing characteristics, alter the tire's attitude relative to a road surface. The attitude of the tire relative to the road surface influences the steer characteristics caused by irregularities in the road surface. Further, the rubber bushings, at attachment points, allow for isolation and damping of road surface induced loads and vibrations. The stiffness characteristics of these rubber bushings can be modified to allow for controlled movement of the suspension system during specific events to alter ride, handling, and isolation characteristics of the vehicle. Fore/aft, yaw, and lateral deflection characteristics of the suspension system have a significant impact on the handling and ride behavior of the vehicle.

All suspension systems are a compromise of cost, mass, packaging, and deflection characteristics. Generally, minimal levels of suspension yaw deflection, while the wheels travel over a road disturbance, is desired. Any yaw of the beam axle while driving over a road disturbance, steers the rear wheels, and correspondingly causes the vehicle to change the direction of its path. This amount of steer due to yaw should be controlled.

The amount of geometric steer of the beam axle due to lateral loading or displacement of the wheel vertically is carefully designed into a vehicle's rear suspension system in order to meet desired handling performance characteristics. In order to achieve the desired levels of steer, the geometry of the locating links of the beam axle is modified. The link geometry of a typical beam rear axle is compromised by physical interference of the links to other components and systems of the vehicle. In a typical five-link arrangement, it is desired to have the forward attachment of the lower fore/aft links placed far outboard. However, this link geometry tends to interfere with traditional vehicle frame structure. The other alternative is to move the rearward bushing attachment at the beam axle inboard. However, this results in the beam axle having very low yaw stiffness, which causes steer effects of the beam axle when the wheel travels over road disturbances due to the fore/aft loading of the wheels.

Further, it is generally desired to have low fore/aft beam stiffness to absorb energy while the wheels are traveling over a disturbance in the road (e.g., bump). It is further desired to have high lateral stiffness in the beam suspension in order to generate good handling characteristics of the vehicle. With traditional link orientations, the fore/aft stiffness is higher than desired in order to achieve the desired level of yaw and lateral stiffness.

Previous beam axle implementations have compromised beam yaw stiffness, lateral force stiffness, and fore/aft stiffness. The compliances are highly coupled, and modifying one stiffness mode for a desired vehicle performance characteristic alters one of the other compliance modes in an undesirable manner. This coupling necessitates a compromise between other compliance modes. The fore/aft, yaw, and lateral deflection characteristics of a rear suspension have a significant impact on the handling, ride and noise and vibration behavior of the vehicle.

SUMMARY OF THE INVENTION

Accordingly, the present invention is a control arm assembly for a suspension system of a vehicle. The control arm assembly includes a control arm having a triangular shape for connection to vehicle structure and a beam axle of the vehicle. The control arm assembly also includes a plurality of bushings connected to the control arm and for connection to the vehicle structure and beam axle of the vehicle.

One advantage of the present invention is that a new control arm assembly is provided for a suspension system of a vehicle. Another advantage of the present invention is that the control arm assembly is provided for a beam axle suspension system of a vehicle. Yet another advantage of the present invention is that the control arm assembly has deflection characteristics that are tunable. Still another advantage of the present invention is that the control arm assembly eliminates undesired compliance. A further advantage of the present invention is that control arm assembly decouples fore/aft, lateral, and yaw compliances. Yet a further advantage of the present invention is that the control arm assembly incorporates a tri-bushing A-Arm lower link having geometry that increases the lateral and yaw stiffness without compromising the desired geometric steer and fore/aft compliance to achieve ride, handling, and noise and vibration performance. Still a further advantage of the present invention is that the control arm assembly provides less coupling of compliance modes, and thus less compromise in desired compliances that results in better vehicle handling, ride, and noise and vibration performance.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 4 is a plan view of the control arm assembly of FIG. 1 illustrating fore/aft stiffness.

FIG. 5 is a plan view of a conventional control arm assembly of FIG. 1 illustrating radial, axial, and conical deflection.

FIG. 6 is a plan diagrammatic view of the control arm assembly and suspension system of FIG. 1 illustrating yaw deflection.

FIG. 7 is a plan diagrammatic view of the control arm assembly and suspension system of FIG. 1 illustrating lateral deflection.

DESCRIPTION OF THE PREFERRED EMBODIMENT

Figure 1:
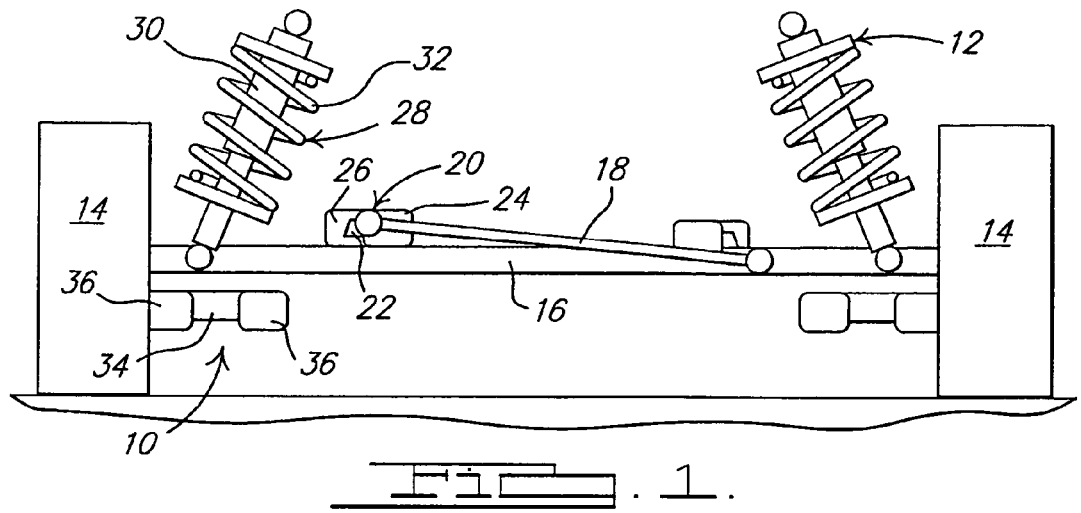
FIG. 1 is a rear diagrammatic view of a control arm assembly, according to the present invention, illustrated in operational relationship with a suspension system of a vehicle.
Figure 2:
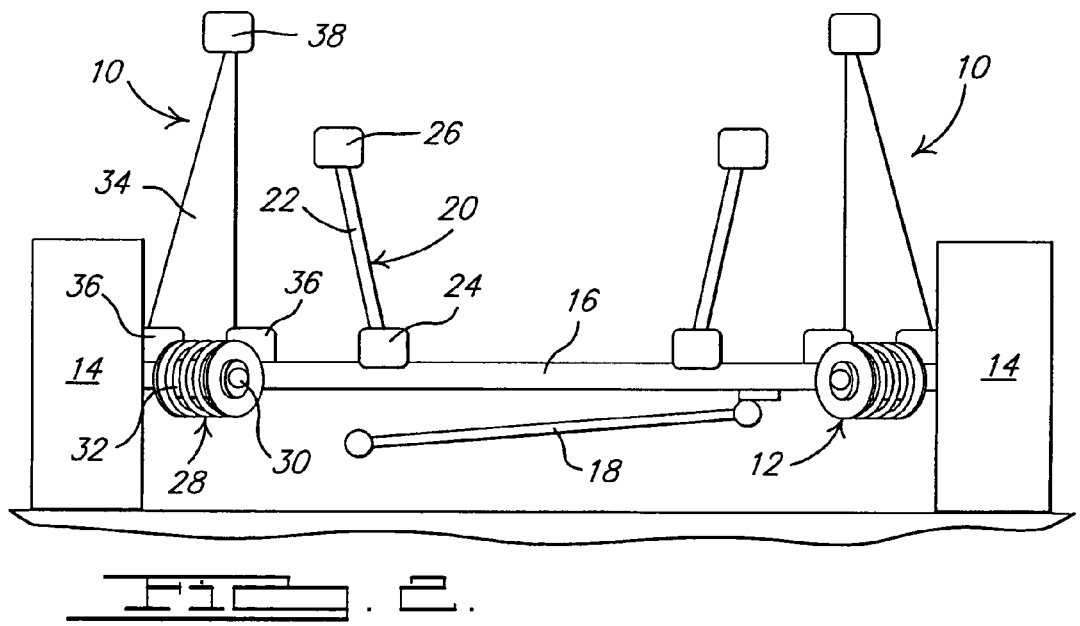
FIG. 2 is a plan diagrammatic view of the control arm assembly and suspension system of FIG. 1.
Figure 3:
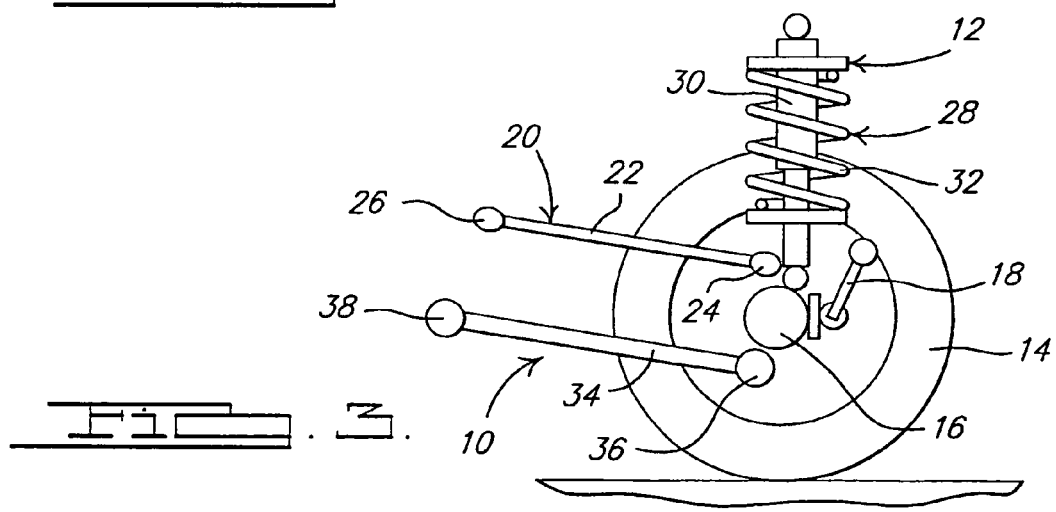
FIG. 3 is a left side diagrammatic view of the control arm assembly and suspension system of FIG. 1.

Referring to the drawings and in particular FIGS. 1 through 3, one embodiment of a control arm assembly 10, according to the present invention, is shown for a suspension system, generally indicated at 12, of a vehicle, such as a motor or automotive vehicle (not shown). The vehicle includes a frame (not shown), at least one, preferably a plurality of wheels 14, and a beam axle 16 extending laterally between a pair of the wheels 14. The beam axle 16 is generally circular in cross-sectional shape, but may have any suitable shape. It should be appreciated that the suspension system 12 is a beam axle suspension system that suspends the frame relative to the wheels 14, and could be of a driven or non-driven application.

The suspension system 12 includes a track bar 18 to locate the beam axle 16 in a cross car or vehicle orientation. The track bar 18 extends laterally and has one end connected to the beam axle 16 and another end connected to vehicle structure (not shown). The suspension system 12 also includes an upper fore/aft link or control arm assembly 20 for controlling the fore and aft and torsional movement of the beam axle 16. The upper control arm assembly 20 includes an upper control arm 22 extending longitudinally and having a generally circular cross-sectional shape, but may have any suitable shape. The upper control arm assembly 20 includes a rearward bushing 24 connected to one end of the upper control arm 22 and the beam axle 16 and a forward bushing 26 connected to the other end of the upper control arm 22 and the vehicle structure. The suspension system 12 also includes the lower control arm assembly 10 to be described. It should be appreciated that the beam axle 16 is located fore and aft via the upper control arm assembly 20 and the lower control arm assembly 10. It should also be appreciated that the upper control arm assembly 20 and the lower control arm assembly 10 locate the beam axle 16 torsionally. It should further be appreciated that the control arm assembly 10 could also be used for the upper control arm assembly 20 or for both the upper and lower control arm assemblies.

The suspension system 12 includes a spring and damper assembly, generally indicated at 28, to control the vehicle location or movement of the beam axle 16. The spring and damper assembly 28 includes a damper 30 having one end connected to the beam axle 16 and another end connected to the vehicle structure. The spring and damper assembly 28 also includes a spring 32 disposed about the damper 30 and connected thereto. It should be appreciated that the control arm assembly 10 is illustrated on a rear suspension system but could be used on a front suspension system. It should also be appreciated that, except for the control arm assembly 10, the suspension system 12 is conventional and known in the art.

Referring to FIGS. 1 through 4 and describing only one of the control arm assemblies 10, according to the present invention, the control arm assembly 10 includes a control arm 34 that may be formed as a single piece or a plurality of pieces assembled together as one-piece. The control arm 34 has a triangular shape, preferably a generally "A" shape or "L" shape. The control arm 34 is made of metal material such as any industry standard material. The control arm 34 is formed integral and one-piece. It should be appreciated that the control arm 34 may be unitary. It should also be appreciated that the control arm 34 is "universal" such that it may be used for a left or right control arm, but could also be non-universal for separate left and right control arms.

The control arm assembly 10 also includes at least one, preferably a plurality of, more preferably a pair of bushings 36 attached to a rearward end of the control arm 34. The control arm assembly 10 includes at least one bushing 38 attached to a forward end of the control arm 34. Each of the bushings 36 and 38 is generally tubular in shape, but may have any suitable shape. Each of the bushings 36 and 38 extends axially and has a generally circular cross-sectional shape. The bushings 36 and 38 are made of a compliant material, preferably an elastomeric material. It should be appreciated that the location and stiffness of the bushings 36 and 38 allows the control arm 34 to control the lateral and yaw stiffness of the beam axle 16. It should also be appreciated that the bushings 36 and 38 can control the deflection of the control arm 34. It should further be appreciated that the bushings 36 and 38 are conventional and known in the art.

In operation, the control arm assembly 10 provides the ability to control the lateral and yaw stiffness of the beam axle 16 through the location and stiffness of the three bushings 36 and 38. Also, the control arm assembly 10 provides a level of lateral deflection and yaw of the beam axle 16 that minimizes the level of steering of the rear wheels 14 during handling events and motions of the beam axle 16 due to road irregularities. Further, the control arm assembly 10 allows the deflection modes of the beam axle 16, (Fore/aft, Lateral, Yaw), to be altered independently from one another, which is not possible with other link arrangements.

Referring to FIGS. 6 and 7, the yaw stiffness and lateral stiffness is significantly increased with the suspension system 12 over a typical five-link rear suspension system. As illustrated in FIG. 6, a rearward force RF is applied to the front of one of the wheels 14 and a forward force FF is applied to the rear of the other one of the wheels 14. The yaw deflection YD of the beam axle 16 is less than a typical link configuration due to the increased yaw stiffness provided by the control arm assembly 10. As illustrated in FIG. 7, a lateral force LF is applied to the side of one of the wheels 14. The lateral deflection LD of the beam axle 16 is less than a typical link configuration due to the increased lateral stiffness provided by the control arm assembly 10. These increased stiffness modes are achieved due to the geometry of the control arm 34 and the corresponding deflection imposed on each bushing 36,38 of the control arm assembly 10. The geometry causes an increased amount of radial deflection of the bushing 36,38 during displacement over conventional link configurations. This increased radial deflection is resisted by the bushings 36,38, and increases the force required to translate the beam axle 16 laterally. Further, as the level of lateral displacement of the control arm 34 is reduced, the amount of yaw displacement of the beam axle 16 is minimized for a given lateral load to the beam axle 16.

Referring to FIGS. 4 and 5, the lateral stiffness of the control arm assembly 10 is a function of the axial, conical and radial stiffness of the three bushings 36 and 38. As illustrated in FIG. 5, a lateral force LF applied to the bushings 36 causes the control arm 34 to pivot about the bushing 38. When the lateral force LF is applied to the control arm assembly 10, a lateral displacement of the beam axle 16 requires that all three bushings 36 and 38 be deflected in the three modes of radial deflection, conical deflection, and axial deflection. For example, the lateral stiffness of the control arm 34 is dominated by the bushings 36, which have a radial stiffness that is relatively high. Since the radial stiffness of the bushing 38 is not a significant contributor to the lateral stiffness of the suspension, it can be lowered in order to achieve lower fore/aft stiffness for better ride isolation. Therefore, the "A" geometry of the control arm 34 has higher lateral stiffness with improved ride isolation. The bushings 36,38 and geometric effects increase lateral stiffness. This multiple deflection of the bushings 36 and 38 significantly increases the stiffness laterally of the control arm 34 versus traditional link configurations. Further, the geometry of the control arm 34 dictates that a significant radial deflection must occur in order to displace the control arm 34 laterally. It should be appreciated that typical bushings have very high radial stiffness, and as such, the major contributor to the lateral stiffness of the control arm 34 is the radial stiffness and the radial deflection experienced.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described. For example, an "A" arm described may be used in the upper link 22, illustrated in FIGS. 1 through 3, instead.

The invention claimed is:

1. A suspension system for a vehicle comprising:
a beam axle extending laterally;
an upper control arm disposed above said beam axle for operative connection to vehicle structure of the vehicle and said beam axle;
a lower control arm extending longitudinally having a forward end and a rearward end forming a triangular shape, said lower control arm being spaced vertically below and laterally outward in relation to a centerline of the vehicle from said upper control arm for operative connection to the vehicle structure and said beam axle;
a plurality of first bushings connected to said rearward end of said lower control arm, said plurality of first bushings comprising a pair of mutually spaced apart first bushings, said plurality of first bushings being disposed below said beam axle for operative connection to said beam axle; and
a second bushing connected to said forward end of said lower control arm for connection to the vehicle structure of the vehicle;
wherein said triangular shape of said lower control arm provides a generally triangular disposition of said pair of first bushings and said second bushing, wherein said plurality of first bushings, said second bushing and said triangular shape of said lower control arm cooperatively provide lateral stiffness of the lower control arm which is a function of axial, conical and radial stiffness of said plurality of first bushings and said second bushing, and further provide deflection modes of said beam axle which are independently alterable.

2. A suspension system as set forth in claim 1 wherein said lower control arm has a general "A" shape.

3. A suspension system as set forth in claim 1 wherein said lower control arm has a general "L" shape.

4. A suspension system as set forth in claim 1 wherein said lower control arm is integral and one-piece.

5. A suspension system as set forth in claim 1 wherein said lower control arm is made of a metal material.

6. A suspension system as set forth in claim 1 including a spring and damper assembly having one end connected to said beam axle and another end for connection to the vehicle structure.

7. A suspension system as set forth in claim 1 including a track bar extending laterally and having one end connected to said beam axle and another end for connection to the vehicle structure.

* * * * *